US007613589B2

(12) United States Patent
Hosagrahara

(10) Patent No.: US 7,613,589 B2
(45) Date of Patent: Nov. 3, 2009

(54) MEASURING PRODUCTIVITY AND QUALITY IN MODEL-BASED DESIGN

(75) Inventor: Arvind Suresh Hosagrahara, Novi, MI (US)

(73) Assignee: The MathWorks, Inc., Natick, MA (US)

( * ) Notice: Subject to any disclaimer, the term of this patent is extended or adjusted under 35 U.S.C. 154(b) by 145 days.

(21) Appl. No.: 11/191,344

(22) Filed: Jul. 27, 2005

(65) Prior Publication Data

US 2007/0027652 A1 Feb. 1, 2007

(51) Int. Cl.
*G06F 11/30* (2006.01)

(52) U.S. Cl. ....................... 702/182; 702/183; 715/762; 715/771

(58) Field of Classification Search ................. 702/182, 702/183; 707/4-6; 706/45-56; 709/223; 715/762, 771
See application file for complete search history.

(56) References Cited

U.S. PATENT DOCUMENTS

| | | | | |
|---|---|---|---|---|
| 5,572,731 | A * | 11/1996 | Morel et al. | 717/104 |
| 5,754,831 | A * | 5/1998 | Berman | 703/13 |
| 6,421,667 | B1 * | 7/2002 | Codd et al. | 707/4 |
| 2006/0143057 | A1 * | 6/2006 | Sadiq | 705/7 |

OTHER PUBLICATIONS

International Search Report for Application No. PCT/US06/29128, dated Mar. 18, 2008.

* cited by examiner

*Primary Examiner*—Drew A Dunn
*Assistant Examiner*—Hien X Vo
(74) *Attorney, Agent, or Firm*—Lahive & Cockfield, LLP; Kevin J. Canning

(57) ABSTRACT

Methods and systems for automatically measuring productivity and quality of model-based designs are disclosed. The present invention uses model contents, time spent, and input activities to measure effort put in a task and quality of the task. Defects and other model characteristics are tracked and used as a criterion to determine quality of a model-based design. The present invention allows for predicting resources required for a future task and for providing guidelines to improve usability of an application.

34 Claims, 12 Drawing Sheets

Visual Display Device 112
Graphical User Interface 114
Computing Device 100
Processor 102
Memory 104
Input Device 106
Input Device 108
Storage 116
Operating System 118
Application Program 120
Modeling Environment 122
Metric Tool 126'
Metric Tool 126

MEASURING PRODUCTIVITY AND QUALITY IN MODEL-BASED DESIGN

FIELD OF THE INVENTION

The present invention is related to automatic measurements of productivity and quality in a model-based design environment.

BACKGROUND

In software design environments, measurements of productivity and quality are useful for balancing workload, creating predictable schedules and budgets, and controlling quality of work. Metrics used for measuring productivity and quality with traditional software development processes include Lines of Code (LOC) and defect densities (defects/LOC) for each unit of work. However, in model-based design environments, these traditional measurements may not accurately reflect productivity of a developer and the quality of the work performed by the developer.

Many model-based designs employ graphical modeling tools where code is automatically generated for execution from a model. In other words, an engineer can produce remarkably more LOC per unit time than it is possible with hand coding and with virtually no software coding defects. Therefore, with the traditional measurements of productivity and quality, not only is it impossible to tell how much effort an engineer has put into a project using a model-based design based on the LOC measure, but also it is difficult to tell if the developer is producing quality work.

Currently, there is software that a user may manually activate after a model is built to count the number of different blocks that are included in the model. However, it is inconvenient that the user needs to manually activate such a function. Additionally, a mere count of different blocks is not a good measure of effort and productivity since some blocks are easier to employ than some others especially in combination with each other.

Therefore, there is a need for a method that can automatically gather data that is useful for evaluating effort and productivity.

SUMMARY OF THE INVENTION

The present invention solves the above-identified problems of using traditional measurements of productivity and quality of work in model-based designs. The present invention can also be used by managers to manage developers and generate reports that identify efficiency and quality of work of developers. An organization may use the present invention to build a database of resources and budgets needed for each task, project and product. The database may be used by the organization to predict time and budget needed for engineers to complete future work assignments. This way, the organization may better balance its workload and control of work quality and further give clients predictable schedule and budget estimates to better serve the clients need.

In one aspect of the present invention, a timer is used to keep track of time spent on each task. A user may input an expected completion time for a task and compare the expected completion time with the actual time spent for completing the task. Work efficiency may be calculated by comparing the expected time required to complete a task with the actual time spent to complete a task.

In another aspect of the present invention, contents of a model may be automatically extracted and summarized to evaluate effort. The word "automatically" is used herein to describe that data are monitored and gathered as a user is designing or modifying a model. However, contents of a model alone are not a good measure of effort, since one can copy and paste hundreds of blocks with a few mouse clicks in a couple of minutes. In still another aspect of the present invention, activities of input devices, such as a mouse or a keyboard, may be automatically tracked to evaluate effort. Therefore, if an engineer copies and pastes a thousand blocks into an empty model with 10 mouse clicks and does not use other input devices, the present invention may generate a report showing a model with a thousand blocks with a very low number of mouse activities. This enables a manager to evaluate more accurately how much effort the engineer put into the model. The manager may have an even better appreciation of how much effort an engineer has put into a task if the report also includes the amount of time the engineer takes to complete the task along with model metrics, such as weighted content metric, complex modeling constructs metric and input device activities. Metrics such as number of blocks created per unit time or the number of input device activities per unit task may be useful to calculate and use as a measure to evaluate effort, productivity, and the like.

The present invention allows assessment of not only complete models but also partially completed models that are not yet ready for compilation, simulation, code generation, or model processing otherwise. The present invention also allows the assessment of models with incomplete library linkage information, such as broken links or partial components of large models. Furthermore, the present invention may support assessment of custom built blocks in a model and hand-written custom codes.

In yet another aspect of the present invention, defects may be detected automatically and manually. Metrics such as number of defects per unit time or defect density (ratio of content value, e.g., number of model entities, and number of defects in a model) may be useful to calculate and use as a measure to evaluate effort and quality of work. In still another aspect of the present invention, model characteristics may also be automatically tracked and reported. In yet another aspect of the present invention, a user may create custom calculations to calculate metrics of special interest.

Reports and plots may be generated to give detail and overall information regarding effort, efficiency, and quality of work of a specific user. The reports may further be used to improve the usability or performance of an application program.

In one embodiment of the present invention, a method for automatically measuring effort in building a model is provided. The method includes the step of providing a modeling application and identifying an activity for which a user wishes to measure effort, wherein the activity entails using said modeling application. The method also includes the step of automatically gathering data related to usage of an input device related to said activity. The method further includes the step of storing the data related to the usage of said input device.

In one aspect of the present invention, the input device is either a mouse or a keyboard. In another aspect of the present invention, the method further includes the step of measuring a time period for the user to complete said activity.

In another embodiment of the present invention, a method of automatically measuring productivity in a modeling environment is introduced. The method includes the step of identifying a task for which a user wishes to measure the productivity, wherein the task requires use of said modeling environment. The method also includes the step of providing a plurality of entities from the modeling environment for use with the task, wherein each entity has a type. The method further includes the step of automatically tracking usage of different types of entities while the user is working on said task.

In one aspect of the present invention, in a graphical block diagram model, the task comprises designing or modifying at least one of a block, a subsystem, and a model. In another aspect of the present invention, a method that further comprises the step of assigning a weight for each type of said plurality of entities and calculating a weighted metric from said plurality of entities. In still another aspect of the present invention, the weight for a type of the plurality of entities is proportional to complexity of building and configuring the type of the plurality of entities. In yet another aspect of the present invention, the method further includes the step of setting a predicted time period required to complete said task. In still another aspect of the present invention, the method further includes the step of measuring time spent for the user to complete the task. In yet another aspect of the present invention, the method further includes the step of detecting at least one of a defect and model characteristic in the task.

In yet another embodiment of the present invention, a medium in a computing device holding computer executable instructions for a method is provided. The method includes the step of providing a modeling application and identifying a task for which a user wishes to measure productivity, wherein the task entails using the modeling application. The method also includes the step of evaluating effort put into the task by tracking use of the input device.

In one aspect of the present invention, the method further includes the step of providing a plurality of entities for use with the task; assigning a weight for each type of the plurality of entities; and calculating a weighted metric from the plurality of entities. In another aspect of the present invention, the method further includes the step of measuring time spent for the user to complete the task. In still another aspect of the present invention, the method further includes the step of automatically detecting a defect or model characteristic in the task.

In still another embodiment of the present invention, a system in a modeling environment for measuring productivity of a task is enclosed. The system includes the element of a task to be completed in said modeling environment and a metric tool. The metric tool may include the element of an input device tracker for tracking use of an input device.

In one aspect of the present invention, the metric tool further includes the element of a weighted content calculator that is capable of normalizing contents created during the task with an assigned weight for each type of contents. In another aspect of the present invention, the metric tool further includes the element of a timer for measuring time spent to complete said task. In still another aspect of the present invention, the metric tool further includes the element of a report generator for reporting metrics found by at least one of the timer, the input device tracker, and the weighted content calculator. In yet another aspect of the present invention, the metric tool further includes the element of a defect detection mechanism for detecting defects in the task. In still another aspect of the present invention, the metric tool further includes the element of a model characteristic detection mechanism for detecting model characteristics. In still another aspect of the present invention, the metric tool is on a server and the input device is on a client and the modeling environment is remotely accessed by a user on the client.

In yet another embodiment of the present invention, a system in a modeling environment for measuring productivity of a task is provided. The system includes the elements of a plurality of entities for use in said modeling environment and a task to be completed in said modeling environment. The system also includes the element of a metric tool including an entity calculator tracking usage of the plurality of entities in the task.

In still another embodiment of the present invention, a productivity management method is introduced. The method includes the step of automatically tracking productivity data of a user within a managed group by measuring effort and time spent for each task, wherein effort is measured by a weighted content metric and usage of an input device. The method further includes the step of storing said productivity data in a storage medium. The method also includes the step of using the productivity data to predict time and effort required to complete a future task.

In one aspect of the present invention, the method further includes the step of determining bonus for said user using said productivity data. In another aspect of the present invention, effort is further measured by number of defects detected in each task. In still another aspect of the present invention, the method further includes the steps of evaluating quality of each task with said number of defects and model characteristics, such as complex modeling constructs, detected and evaluating productivity and effort of each task with the measured effort and time spent. In yet another aspect of the present invention, the method further includes the step of generating a report of said productivity data.

In yet another embodiment of the present invention, a method of improving an application program is introduced. The method includes the step of monitoring user activity with an application program by tracking usage of an input device. The method further includes the step of recording time spent on the plurality of tasks, wherein the plurality of tasks include at least one of an application program task performed by the application program and a user task performed by the user. The method also includes the step of generating a report including time spent on the plurality of tasks and the usage of the input device.

In one aspect of the present invention, one of the plurality of tasks includes waiting for the application program to finish compiling a model. In another aspect of the present invention, the method further includes the step of modifying the application program to speed up compilation of a model. In yet another aspect of the present invention, the report indicates multiple appearance of a specific sequence of input activity. In still another aspect of the present invention, the method further includes the step of modifying the application program to eliminate the appearance of the specific sequence of input activity. In yet another aspect of the present invention, the report indicates a performance issue. In still another aspect of the present invention, the method further includes the step of modifying the application program to eliminate the performance issue. In yet another aspect of the present invention, the method further includes the step of improving the application program in response to the report.

The details of various embodiments of the invention are set forth in the accompanying drawings and the descriptions below.

BRIEF DESCRIPTION OF THE FIGURES

The foregoing and other objects, aspects, features, and advantages of the invention will become more apparent and may be better understood by referring to the following description taken in conjunction with the accompanying drawings, in which.

DETAILED DESCRIPTION

Certain embodiments of the present invention are described below. It is, however, expressly noted that the present invention is not limited to these illustrated embodiments, but rather the intention is that additions and modifications to what is expressly described herein also are included within the scope of the invention. Moreover, it is to be understood that the features of the various embodiments described herein are not mutually exclusive and can exist in various combinations and permutations, even if such combinations or permutations are not expressly made herein, without departing from the spirit and scope of the invention.

The illustrated embodiments of the present invention provide a method and system for measuring quality of work, effort and productivity of a user. The illustrated embodiment of the present invention also provides means for balancing workload, creating predictable schedules and budgets, and controlling quality of work for an organization. In one embodiment, the present invention also provides means for monitoring usability and performance of an application program and hence provide indications of parts of the application program that may be modified to improve performance and/or usability. In another embodiment, the present invention allows assessment of not only complete models but also partially completed models that are not yet ready for compilation, simulation, code generation, or model processing otherwise. In yet another embodiment, the present invention also allows the assessment of models with incomplete library linkage information, such as broken links or partial components of large models. Furthermore, in still another embodiment, the present invention may support assessment of custom built blocks in a model and hand-written custom codes.

Figure 1:
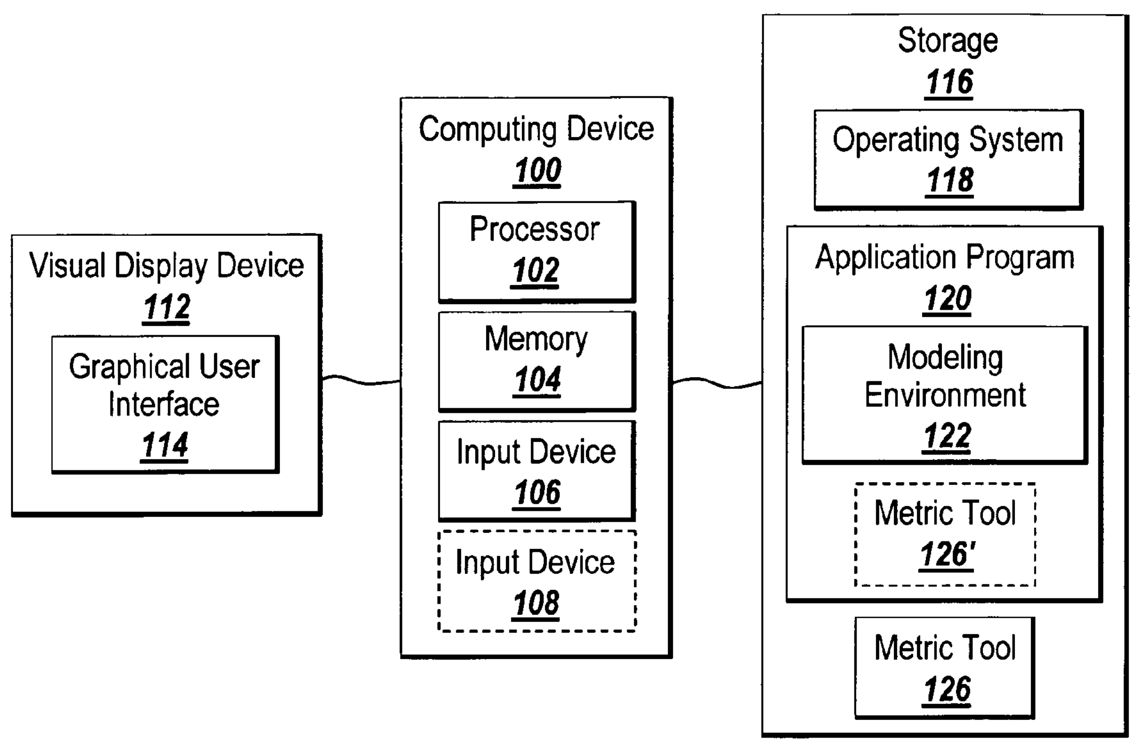
FIG. 1 is an exemplary environment that is suitable for practicing one embodiment of the present invention.

FIG. 1 depicts an environment suitable for practicing an illustrative embodiment of the present invention. The environment includes a computing device 100 having memory 104, on which application program 120 according to one embodiment of the present invention may be stored, a processor 102 for executing the application program 120, and other programs for controlling system hardware. The computing device 100 may be any computer system such as a desktop computer, laptop, workstation, server, handheld computer, or other form of computing device that has sufficient processor power and memory capability to practice the present invention. The memory 104 may comprise a computer system memory or random access memory such as DRAM, SRAM, etc. The memory 104 may comprise other types of memory or a combination thereof. A visual display 112, which includes a graphical interface 114, enables a user to interact with the computing device 100. The visual display 112 can be a computer monitor, TV, projector, and the like.

The computing device 100 may also include other devices, such as a first input device 106 and optionally a second input device 108 that may be connected to the visual display device 112. The first input device 106 and second input device 108 may be any one of a keyboard, a pointing device, and the like. The computing device 100 may also include other peripherals to practice the present invention. The computing device 100 may further comprise a storage 116, such as a hard drive, CD-ROM, RAM, or Flash disk, for storing operating system 118 and other software, and for storing metric tool 126 and application program 120 which includes modeling environment 122. Those skilled in the art will appreciate that metric tool 126 is adaptable to be included as part of the application program 120 (metric tool 126') or a stand alone application that responds to calls from the application program 120. Furthermore, those skilled in the art will appreciate that applications and data can be stored in memory 104 and storage 116 interchangeably. The illustrative embodiments are described solely for illustrative purposes relative to a user interface, graphical model, and modeling environment provided by the software products from The Mathworks, Inc. of Natick, Mass. Although the illustrative embodiments will be described relative to a MATLAB® and/or Simulink®-based application, however, one of ordinary skill in the art will appreciate that the present invention may be applied to other user interfaces, graphical models, modeling environment, and technical computing environments, including state-based and flow diagram environments, data flow diagram environments, electronic design automation (EDA) environments, Schematic Layout environments, and Unified Modeling Language (UML) environments, such as those using software products of LabVIEW® or MATRIXx from National Instruments, Inc. of Austin, Tex., Virtuoso, Incisive, or Encounter from Cadence of San Jose, Calif., Dymola from Dynasim AB of Lund, Sweden, SystemView® from Elanix of Norcross, Ga., Mathematica® from Wolfram Research, Inc. of Champaign, Ill., Mathcad from Mathsoft Engineering & Education Inc. of Cambridge, Mass., Maple™ from Maplesoft, a division of Waterloo Maple Inc. of Waterloo, Ontario of Canada, Galaxy™ or Discovery™ from Synopsis, Inc. of Mountain View, Calif., Design Architect, Questa, or Board Station from Mentor Graphics Corp. of Wilsonville, Oreg., Rose from International Business Machine Corporation of Armonk, N.Y., Rhapsody from I-Logix, Inc. of Andover, Mass., or Artisan from Artisan Software Tools, Inc. of Beaverton, Oreg. and the like.

For simplicity of discussion, FIG. 3 through 9 are discussed with respect to an environment such as shown in FIG. 1.

Figure 2:
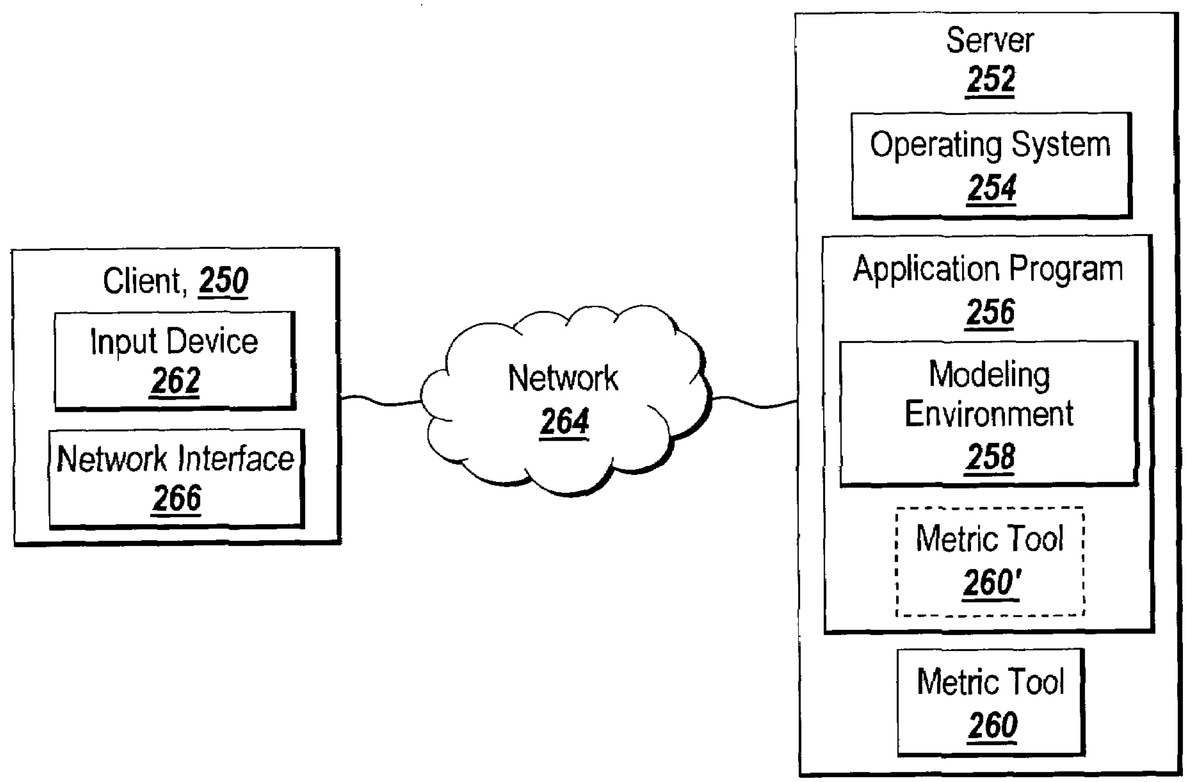
FIG. 2 is an exemplary client-server environment that is suitable for practicing one embodiment of the present invention.

FIG. 2 illustrates an exemplary client-server environment that is suitable to practice one embodiment of the present invention. Server 252 includes an operating system 254, a metric tool 260 and an application program 256 that has a modeling environment 258. Alternatively, metric tool 260 may be a tool 260' within the application program 256. A client 250 includes a network interface 266 to communicate with server 252 via a network 264, such as Local Area Network (LAN), Wide Area Network (WAN), wireless network or the Internet through a variety of connections including, but not limited to, standard telephone lines, LAN or WAN links, broadband connections, wireless connections, or some combination of any or all of the above. Client 250 can run application program 256 remotely, such as using thin client or fat client technology. Metric tool 260 is able to track input activities into application program 256 via input device 262 on client 250. Metric tool 260 may be used as a client based interface, such as an ActiveX control that is downloaded to the client for running application program 256 remotely. One of ordinary skill in the art will appreciate that a client side control will allow the monitoring of activities of input device 262 and send the logged data back to the server for analysis. Alternatively, metric tool 260 may be used as a server-side application that allows the monitoring of activities of input device 262 within the remote application program 256. However, for simplicity of discussion, FIG. 3 to 9 will be discussed relative to an environment such as shown in FIG. 1.

Figure 3A:
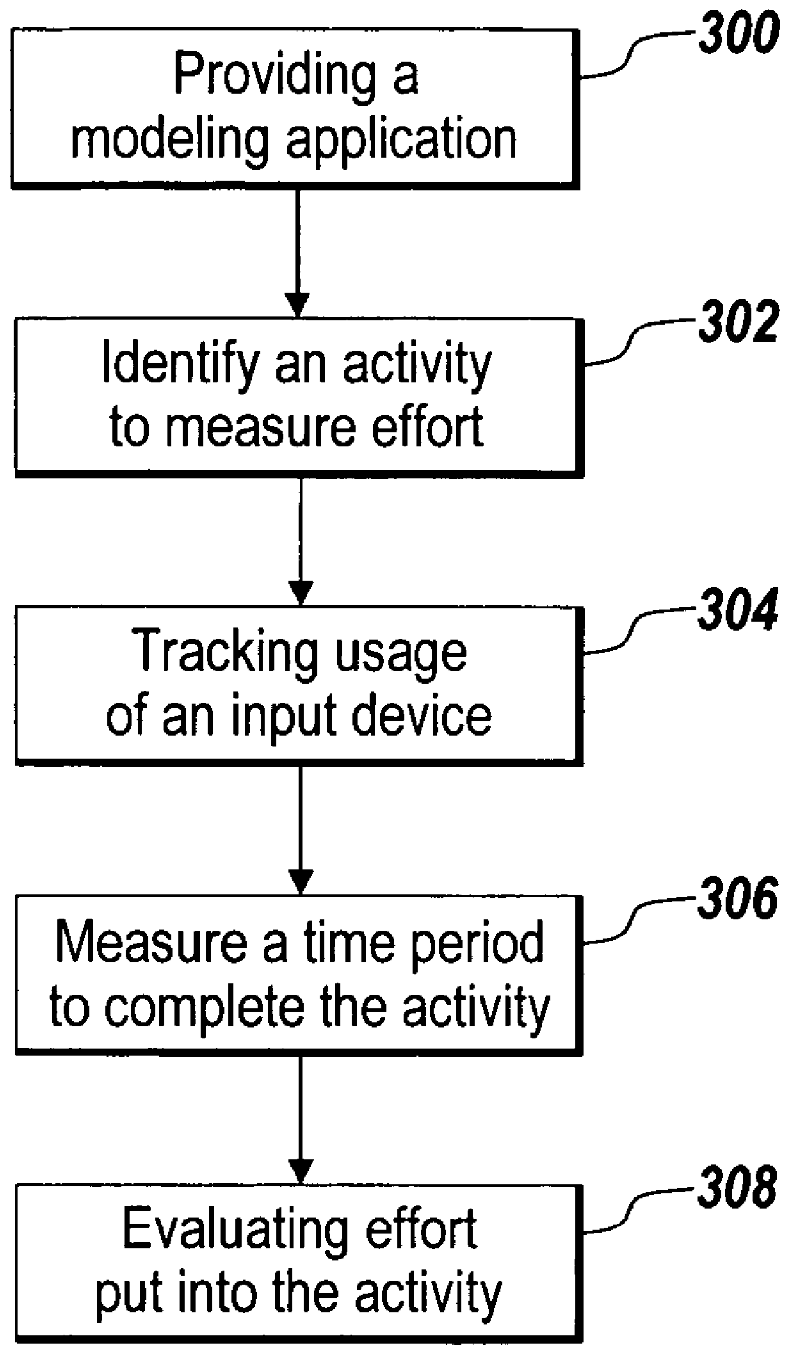
FIG. 3A shows a flowchart depicting the steps taken to practice one embodiment of the present invention.

FIG. 3A shows a flowchart for measuring effort in a computational device having an input device. After providing a modeling application in step 300, an activity is identified for measuring effort in step 302. Usage of an input device is then monitored in step 304. Optionally, a time period to complete the identified activity is measured in step 306. Lastly, effort put into the activity is evaluated in step 308 using the usage of the input device and optionally the measured time spent.

Figure 3B:
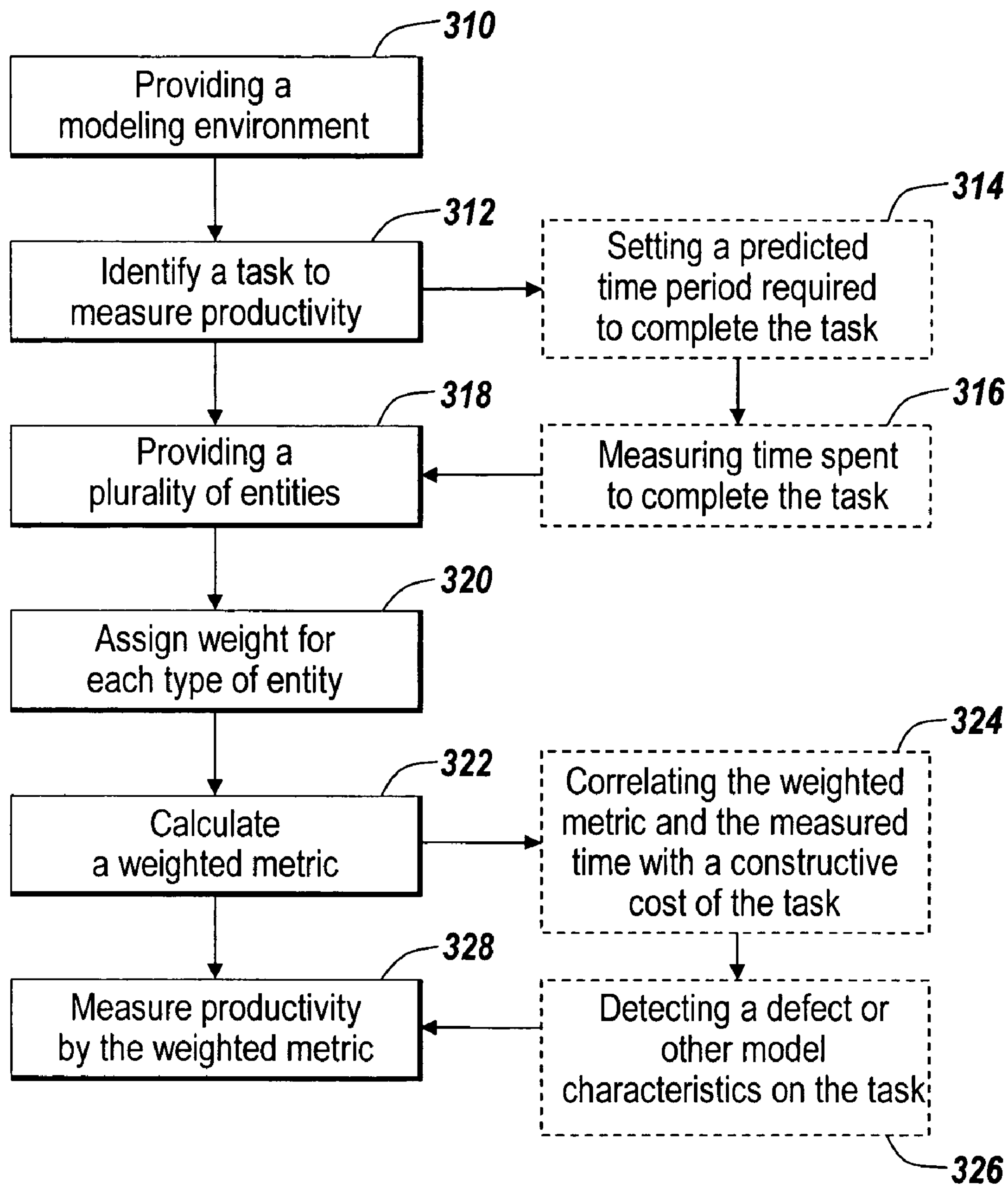
FIG. 3B shows a flowchart depicting the steps taken to practice another embodiment of the present invention.

FIG. 3B shows a flowchart for measuring productivity data for a task. In step 310, a modeling environment is provided. A task is identified for measuring productivity in step 312. Optionally, a predicted time period may be set to indicate expected time required for completing the task in step 314. Furthermore, in step 316, actual time spent on completing the task may be measured. In step 318, a plurality of entities is provided for use with the task. For each type of entity, a custom weight is assigned in step 320. Next, a weighted content metric may be calculated in step 322. Optionally, the weighted content metric and the measured actual time spent may be correlated with a constructive cost of the task in step 324. In step 326, detection of defects and other model characteristics may optionally be performed. Lastly, productivity may be measured by the weighted metric and other available data such as time and defects in step 328.

Figure 3C:
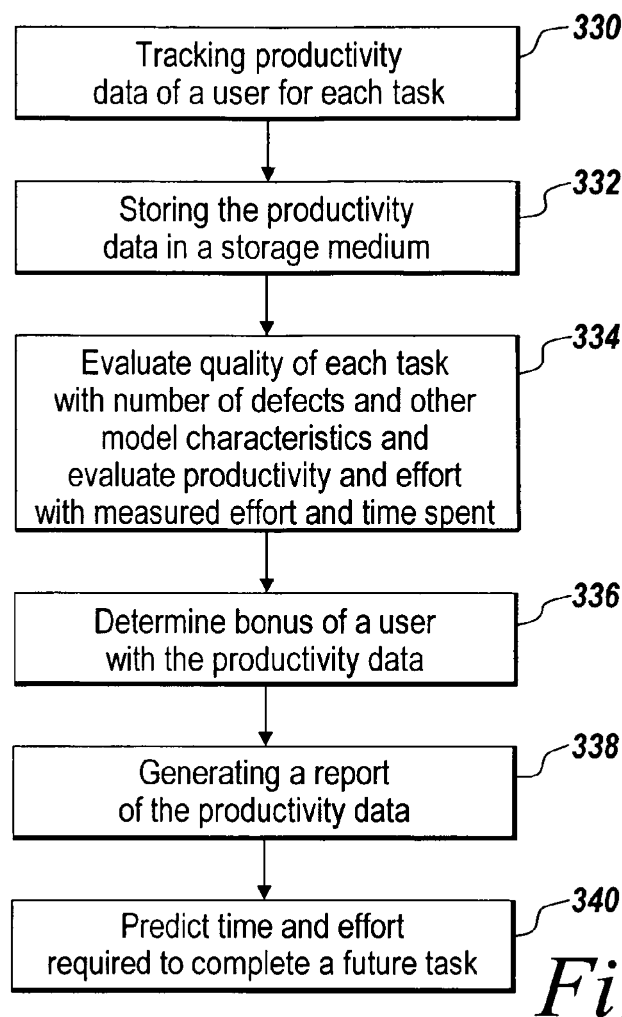
FIG. 3C shows a flowchart depicting the steps taken to practice yet another embodiment of the present invention.

FIG. 3C depicts a flowchart for practicing productivity management aspect of the present invention. Step 330 tracks productivity data of a user by measuring effort and time spent for each task. Effort may be measured by a weighted content metric and usage of an input device. Productivity data is stored in a storage medium in step 332. Defects and other model characteristics in each task may be optionally tracked. Quality of each task can then be evaluated with number of defects and other model characteristics in step 334. Productivity and effort may also be evaluated with measured effort and time spent in step 334. A manager may optionally use the productivity data to determine a bonus for a user in step 336. Reports may also be optionally generated in step 338. With the productivity data indicating time and effort spent on each task, time and effort required can be predicted for a future task or project in step 340.

Figure 3D:
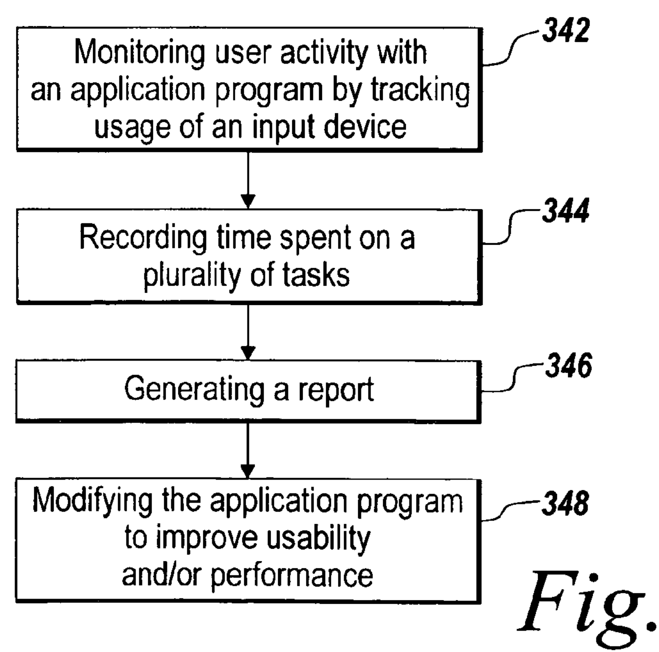
FIG. 3D shows a flowchart depicting the steps taken to practice still another embodiment of the present invention.

In another embodiment, the present invention may be used to monitor the usability of an application program and to provide feedback to the developer of the application program for improving the usability of the application program. Furthermore, performance of the application program may also be monitored and improved. FIG. 3D depicts a flowchart for practicing improving application usability aspect of the present invention. Metric tool 126 monitors user activity with an application program by tracking usage of an input device in step 342. Metric tool 126 may also record time spent on a plurality of tasks in step 344. Tasks here are broadly defined to be any task that needs to be completed by the application program 120 and/or a user, such as loading a model, building a subsystem within a model, compiling a model, etc. A report is generated in 346 to reflect the performance of the application program 120 and the user interaction with the user interface of the application program 120. Based on the report, application program 120 may be modified to improve usability and/or performance.

Figure 6:
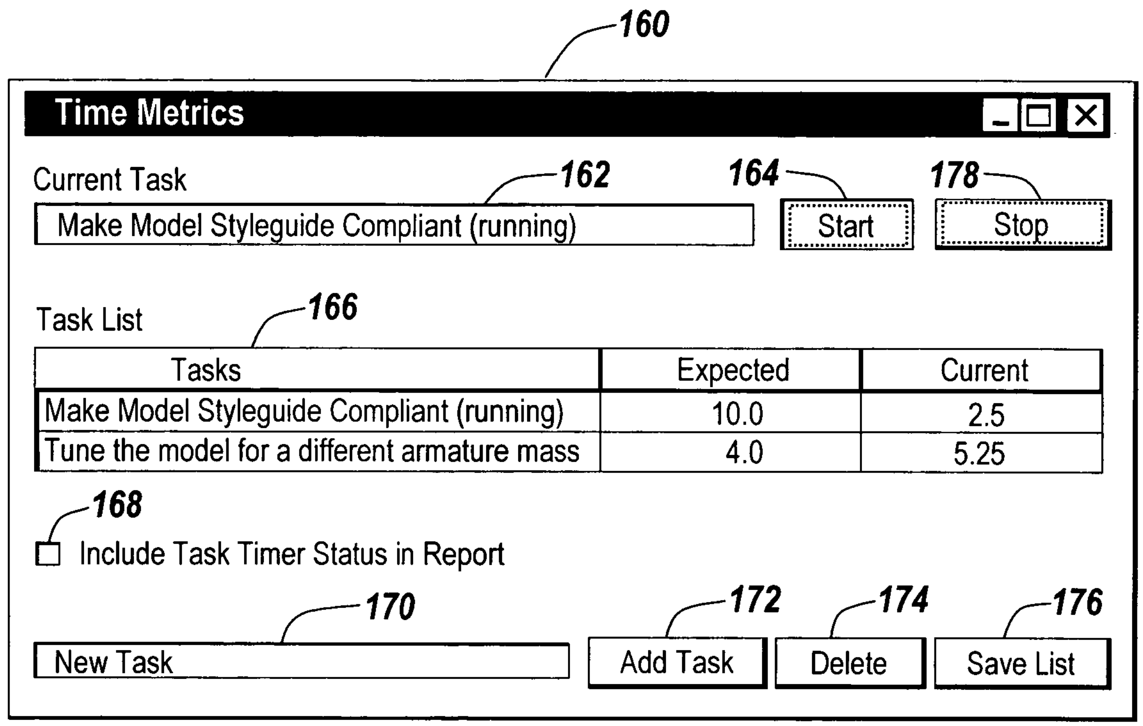
FIG. 6 is an exemplary graphical user interface for interacting with metric tool 126 to measure time metric of a task.

For example, two different user interfaces may be developed for application program 120, in one embodiment, the present invention may be used to provide feedback on which user interface is more user-friendly. The determination may be which user interface takes the same users less amount of time to complete an identical task. Additionally, an embodiment of the present invention may be used to improve different aspects of a user interface for an application program. For example, if a user spends a significant amount of time clicking a particular sequence of buttons on the user interface, the user interface may be redesigned to eliminate the need to click the particular sequence of buttons. Furthermore, an embodiment of the present invention may also be used to identify specific performance issues of an application program. For example, by using the time metrics as shown in FIG. 6, a user may record how much time the application program spent on compiling, simulating, generating code, other model processing, or loading a model and if a significant amount of time is used on compiling, simulating, generating code, other model processing, or loading of a model, then the application program may be redesigned to improve such performance issues or alternatively, the user may choose to utilize a device with more computational capability to run the application program.

Figure 4:
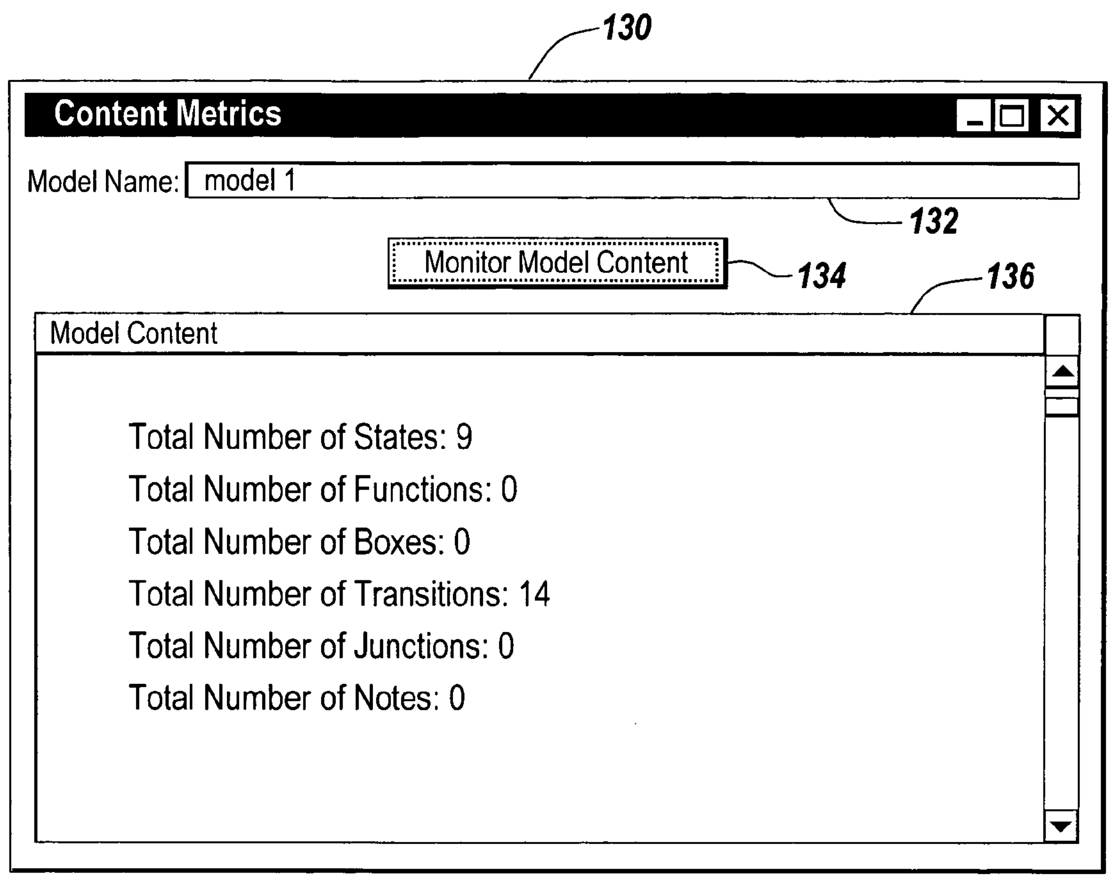
FIG. 4 is an exemplary graphical user interface for interacting with metric tool 126 to acquire content metric of a model.
Figure 5A:
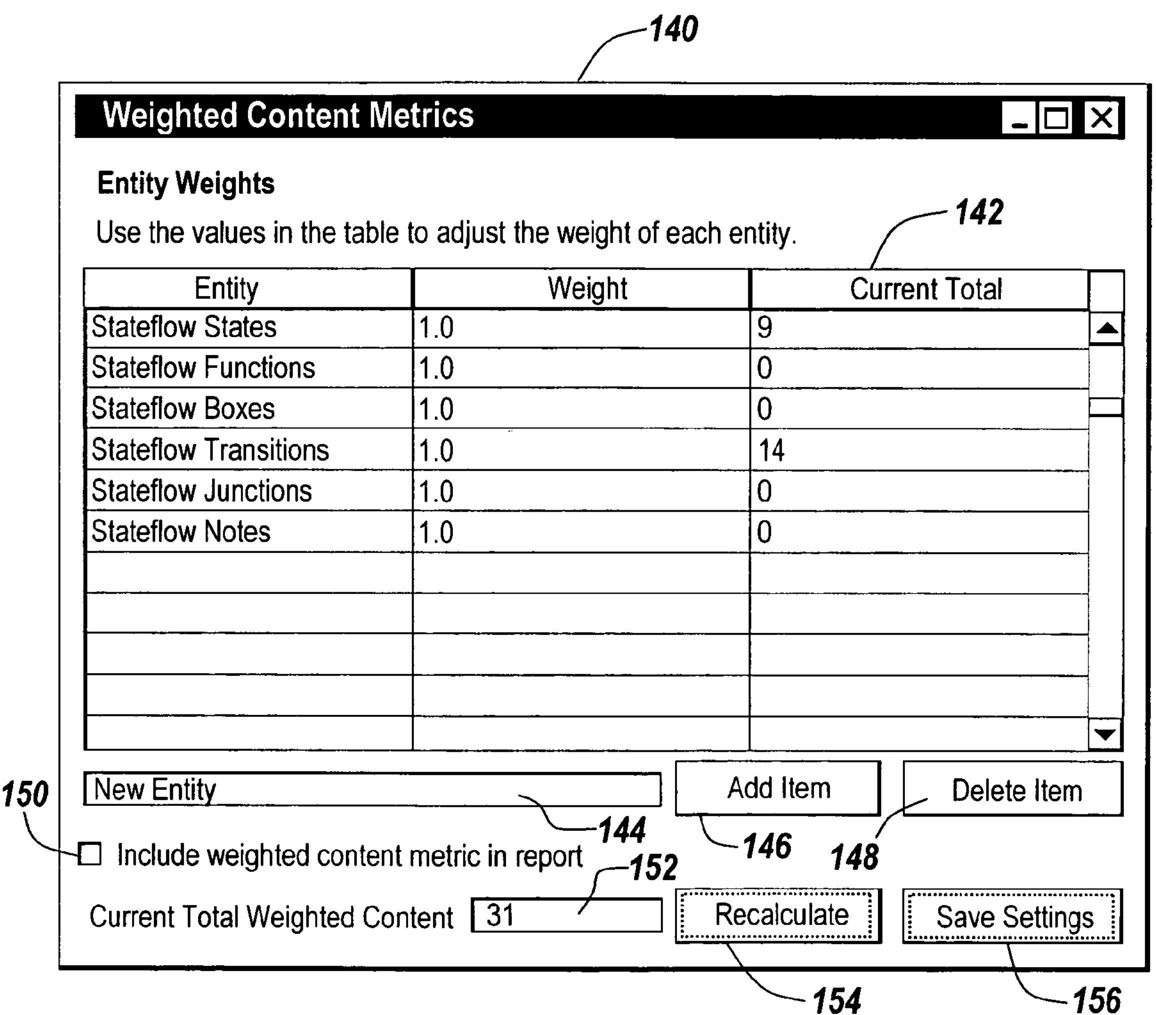
FIG. 5A is an exemplary graphical user interface for interacting with metric tool 126 to generate a weighted content metric of a model.
Figure 5B:
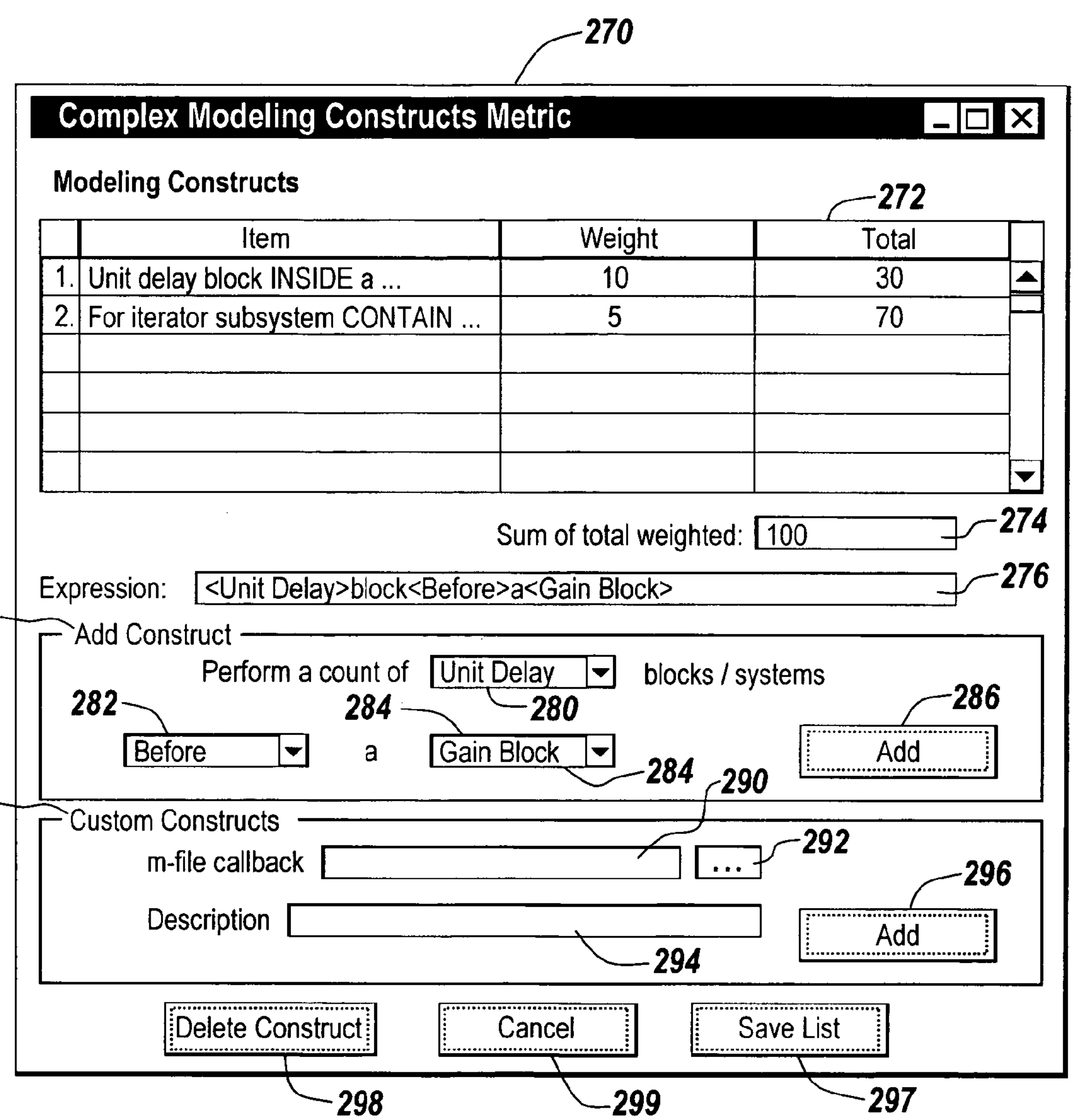
FIG. 5B is an exemplary graphical user interface for interacting with metric tool 126 to generate a weighted metric of complex modeling constructs of a model.

By way of example, FIGS. 4 and 5A are described relative to a model in Stateflow® from the MathWorks, Inc. of Natick, Mass. and FIG. 5B is described relative to a model in Simulink® from the MathWorks, Inc. of Natick, Mass. FIG. 4 depicts an exemplary graphical user interface to interact with metric tool 126 to acquire content metric of a model. Content metric window 130 includes a text field 132 to enter name of a model of which a user wishes to monitor the contents. After a model name is entered in text field 132, a user can click on monitor model content button 134 to ask metric tool 126 to monitor and summarize the contents of the model with the given model name in text field 132. After a model is specified in text field 132, metric tool 126 automatically monitors and captures model contents that are created, modified, or deleted as the user designs and/or modifies the model.

Metric tool 126 may obtain the contents of a model by reading a model file or another file containing a preprocessed or intermediate representation of the model. One of ordinary skill in the art will appreciate that contents of a model may also be read from memory, a repository, a database, and the like. In one embodiment, the model may be obtained by making an API call to another application, such as application program 120. By way of example, Simulink® and Stateflow® create and store block diagram models into model files with a .mdl file extension. Various classes of block diagram models describe computations that can be performed on application specific computational hardware, such as a computer, microcontroller, FPGA, and custom hardware. Classes of such block diagram models include time-based block diagrams such as those found within Simulink®, state-based and flow diagrams such as those found within Stateflow® and dataflow diagrams. A common characteristic among these various forms of block diagram models is that they define semantics on how to execute the diagram.

The metric tool 126 can read the mdl files or make an API call to an application to extract the number and the type of blocks created in the models. Metric tool 126 then displays the contents of a model in a model content window 136. Model content window 136 can have a scroll bar so that the length of the model content report does not need to be limited to a few content items. Model content window 136 may display not only the contents of a model; it may also display model settings, model block count totals, model simulation sizes, library link information, custom codes, and the like. Model content window 136 may display for each type of content detailed information, such as number of characters or lines of code. Lines of code may refer to any of the following: lines of auto-generated code, lines of MATLAB® code, lines of C code included using custom code inclusion functionality in Simulink® and Stateflow®, and lines of code in Stateflow® action language. Lines of code may be further studied and compared with cyclomatic complexity of a model from which the code is generated from. Cyclomatic complexity of a model is further discussed below in FIG. 5B. The user may perform a correlation of the complexity of the lines of code with effort required to produce the content and quality of the counted lines of code. This may be achieved by using the calculated metric function as discussed in FIG. 9 below. Alternatively, lines of code may be studied to provide a function point analysis of the counted lines of code along with the corresponding Simulink® and/or Stateflow® contents.

One skilled in the art will recognize that the examples given here are not the only aspects of model contents that metric tool 126 may assess from the model. One skilled in the art will also recognize that a simple count of blocks created is not a good measurement of effort because some blocks are more difficult to employ and configure while some others might require just a couple of mouse clicks. The present invention provides means to add and enter custom weights for each block type as shown in FIG. 5A.

FIG. 5A depicts an exemplary graphical user interface to interact with metric tool 126 to assign weights to each type of entity and calculate a weighted content metric. By way of an example, in the graphical block diagram modeling environment, some blocks are easier to employ than others, therefore the traditional counting of blocks does not give a comprehensive measure of effort and time spent on building a model. The present invention allows custom assigned weights for all entity types within a model. The assigned weights may be an indication of complexity of building, employing, configuring and the like, of an entity, and therefore an indication of how much effort and time would be required in working with the block. As a result, metric tool 126 may be used to emphasize effort and time involved in building certain entities. Weighted content metric window 140 includes a table 142 listing an assigned weight and total for each entity type. An entity is any single unit that can be identified by application program 120 in the modeling environment 122. Table 142 can include a first column listing different types of entities, a second column listing an assigned weight of the corresponding entity type in the same row, and a third column displaying the current weighted total of the corresponding entity type in the same row. The current weighted total is calculated by multiplying an assigned weight of an entity type and a count (not shown) of total number of the entity type. Weighted content metric 140 further includes a text field 144 for a user to enter a new entity type. When a user clicks on add item button 146, the entity type entered in text field 144 will be added to table 142. Delete Item button 148 enables a user to delete the entity type entered in text field 144 from table 142. Text field 152 will display the current total weighted content when a user clicks on recalculate button 154. A check box 150 may be included in weighted content metric window 140 for a user to have an option to include the weighted content metric in a report. A save settings button 156 may also be included in weighted content metric window 140 to allow a user to save the settings of assigned weights of each entity type.

FIG. 5B is an exemplary graphical user interface for interacting with metric tool 126 to generate a weighted metric of complex modeling constructs of a model in Simulink®. Similar to weighted content metric shown in FIG. 5A, complex modeling constructs may be assigned different weights according to the complexity of the modeling constructs and/or the amount of effort to build such modeling constructs. All weights may be custom assigned or pre-determined. A simple counting of basic contents in a model such as shown in FIG. 5A does not always accurately reflect the cyclomatic complexity of the model structure or the effort and time spent in designing the model. For example, a delay block that is inside a triggered subsystem inherits the sample time of the subsystem, thus making the behavior of the corresponding model more complex.

Complex modeling constructs metric window 270 includes a modeling construct table 272 listing the different complex modeling construct items. For each complex modeling construct item, modeling construct table 272 includes a description of the complex modeling construct item, an assigned weight, and a total weight that is calculated by multiplying the assigned weight with a count of the total number of listed complex modeling construct (not shown). Modeling construct table 272 may have a scroll bar that allows a user to scroll through the list of complex modeling construct items. Text field 274 displays the sum of all the total weighted modeling constructs.

Complex modeling metric window 270 may additionally include an add construct option 278 that allows a user to add to the built-in complex modeling constructs using drop-down menus. Drop-down menus 280 and 284 may contain several items such as unit delay, memory block, zero-order hold, signal attribute, conditionally executed subsystem, model reference block, and the like. Drop-down menu 282 may include several relationship phrases, such as "inside", "containing", "at the same level as", parenting", "before", "after", and the like. The corresponding expression determined by the several drop-down menus in the add construct option 278 is displayed in the expression text field 276. The expression shown in the expression text field 276 further becomes the description of a corresponding complex modeling construct item in the modeling construct table 272 once a user clicks on the add button 286.

Complex modeling construct metric window 270 may also include a custom construct option 288 for a user to track a certain complex modeling construct using a MATLAB® script. Custom construct option 288 includes a text field 290 for a user to input the location of the MATLAB® script.

Alternatively, a user may use browse button 292 to browse to the desired MATLAB® script. Custom construct option 288 also includes a text field 294 for the user to enter a description of the complex modeling construct that the user intends to track using the MATLAB® script specified in text field 290. Custom construct option 288 further includes an add button 296 for adding the custom construct to the modeling construct table 272.

Complex modeling construct metric window 270 further includes a save list button 297 for saving the list of complex modeling construct items in the modeling construct table 272. A cancel button 299 may also be included in the complex modeling construct metric window 270 to allow a user to cancel any changes that are made to the list of complex modeling construct items in the modeling construct table 272 since the last time the list was saved. Complex modeling construct metric window 270 may further include a delete construct button 298 for deleting an item from the list of modeling construct items in the modeling construct table 272. Alternatively, the function provided by the delete construct button 298 may be provided by the right-click mouse menu instead of a button.

FIG. 6 depicts an exemplary graphical user interface for using metric tool 126 to measure time spent on a task. A task is any work required to fulfill a specific design-modeling goal. Task metric window 160 includes a text field 162 for displaying a task for which a user wishes to measure time spent on the task by starting a timer using start button 164. Task list table 166 includes a listing of all the tasks that a user wants to measure time spent. A task may be selected to start a timer by highlighting the task in task list table 166 and the clicking on start button 164. Multiple timers may also be started simultaneously by highlighting multiple tasks in task list table 166 and then clicking on start button 164. The multiple timers option may be desirable for users who create two tasks where one is a subtask of another.

Task list table 166 may include a first column listing tasks measured, a second column with assigned expected completion time of the corresponding task in the same row, and a third column with current (actual) time spent on the corresponding task in the same row. The user may click on stop button 178 to stop the timer after the user has stopped working on the task. The time elapsed between the user clicks on start button 164 and stop button 178 is then used to update the current time spent in the third column of the corresponding task in task list table 166. Task list table 166 may optionally have a scroll bar if the lists of tasks cannot fit in the fixed panel space of task list table 166. Check box 168 may also be included in time metric window 160 for a user to have an option to include time metric status of each task in the task list table 166 in a report. Time metric window 160 may also include a text field 170 allowing a user to add a new task to the task list table 166 by entering the name of the new task and clicking on add task button 172. Delete button 174 may be included in time metric window 160 allowing a user to delete a task by entering the name of a task the user wishes to delete from the task list table 166. Time metric window 160 may also have save list button 176 for saving the list of tasks in the task list table 166.

Figure 7A:
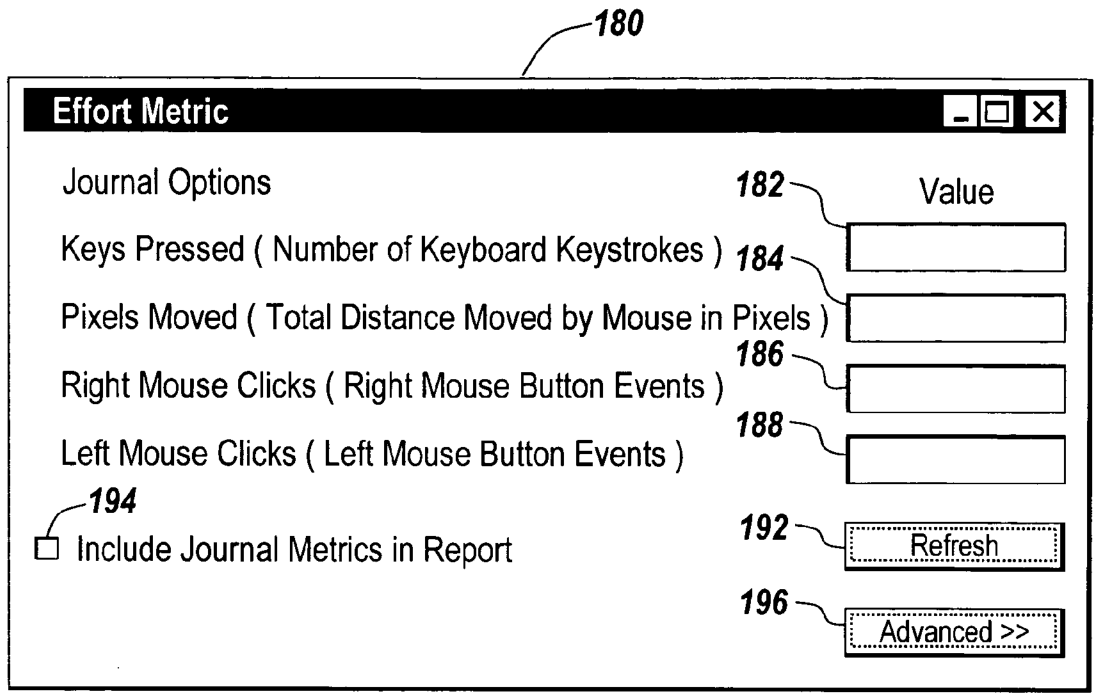
FIG. 7A is an exemplary graphical user interface for interacting with metric tool 126 to measure effort metric.
Figure 7B:
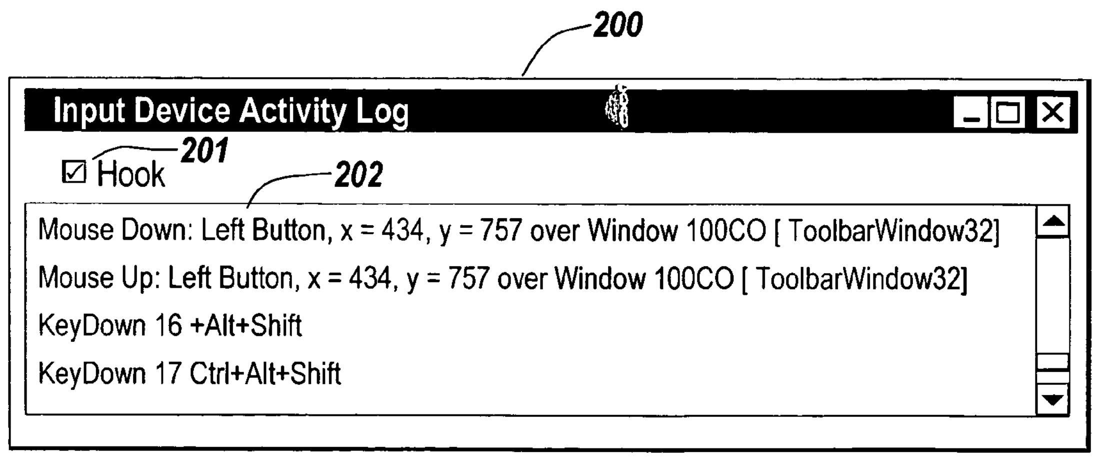
FIG. 7B is an exemplary graphical user interface for showing a log of input device activity.

Besides from calculating a weighted content metric to measure effort put in a model, a metric of usage amount of input devices may also provide some insights into the effort that one wants to measure and evaluate. FIG. 7B is discussed in conjunction with FIG. 7A to illustrate an embodiment of the present invention. FIG. 7A depicts an exemplary graphical user interface for using metric tool 126 to measure effort metric using the journal option. Effort metric and journal option here both refer to activities of input devices. By way of example, FIG. 7A shows the activities of a keyboard and a mouse. Effort metric window 180 includes a first text field 182 for displaying number of keyboard keystrokes, a second text field 184 for displaying total distance moved by a mouse in pixels, a third text field 186 for displaying number of right mouse clicks, and a fourth text field 188 for displaying number of left mouse clicks. One of ordinary skill in the art will appreciate that other input activities, such as middle mouse activities and mouse wheel activities, may also be tracked using metric tool 126. Upon clicking on refresh button 192, the values in the first, second, third, and fourth text fields will be updated. Check box 194 may also be included in effort metric window 180 to give a user an option to include journal metric in a report.

Metric tool 126 can capture all input activities such as mouse and keyboard events on the computing device 100. By way of an example, in the Microsoft Windows® operating system, a structure called EVENTMSG contains window event messages about all input activities performed and serviced by the operating system. An ActiveX control may be used to monitor these window event messages. For each window event message, there is an event code whose associated data can be read to identify, but not limited to, which key or mouse button has been pressed, the coordinates of mouse clicks, the window of the mouse clicks or keystrokes (see examples in FIG. 7B). Furthermore, the event message also identifies which window the input activity is exerted upon as can be seen in FIG. 7B.

FIG. 7B depicts an exemplary graphical user interface for showing a log of input device activities. Upon clicking on advanced button 196 in FIG. 7A, an input device activity log window 200 as shown in FIG. 7B is brought up for display. Input device activity log window 200 includes a text box 202 showing a log of all activities of a mouse or a keyboard. Unchecking the hook check box 201 disable the tracking option of input device activities.

As explained above, one embodiment of the present invention enables the tracking of input activity for each window. However, metric tool 126 in effort metric window 180 may choose to track input activities for the whole operating system, since effort invested in a model or a task may not include only the input activities within the modeling environment 122 of application program 120. One skilled in the art will appreciate that at design time, an engineer may need to refer to references in pdf documents, Microsoft Word documents, databases, spreadsheets, resources on the World Wide Web, and the like to complete the design of a model. Therefore, options may be included in effort metric window 180 to choose to track input activities for each window, a selected group of windows, or the entire operating system.

Figure 8:
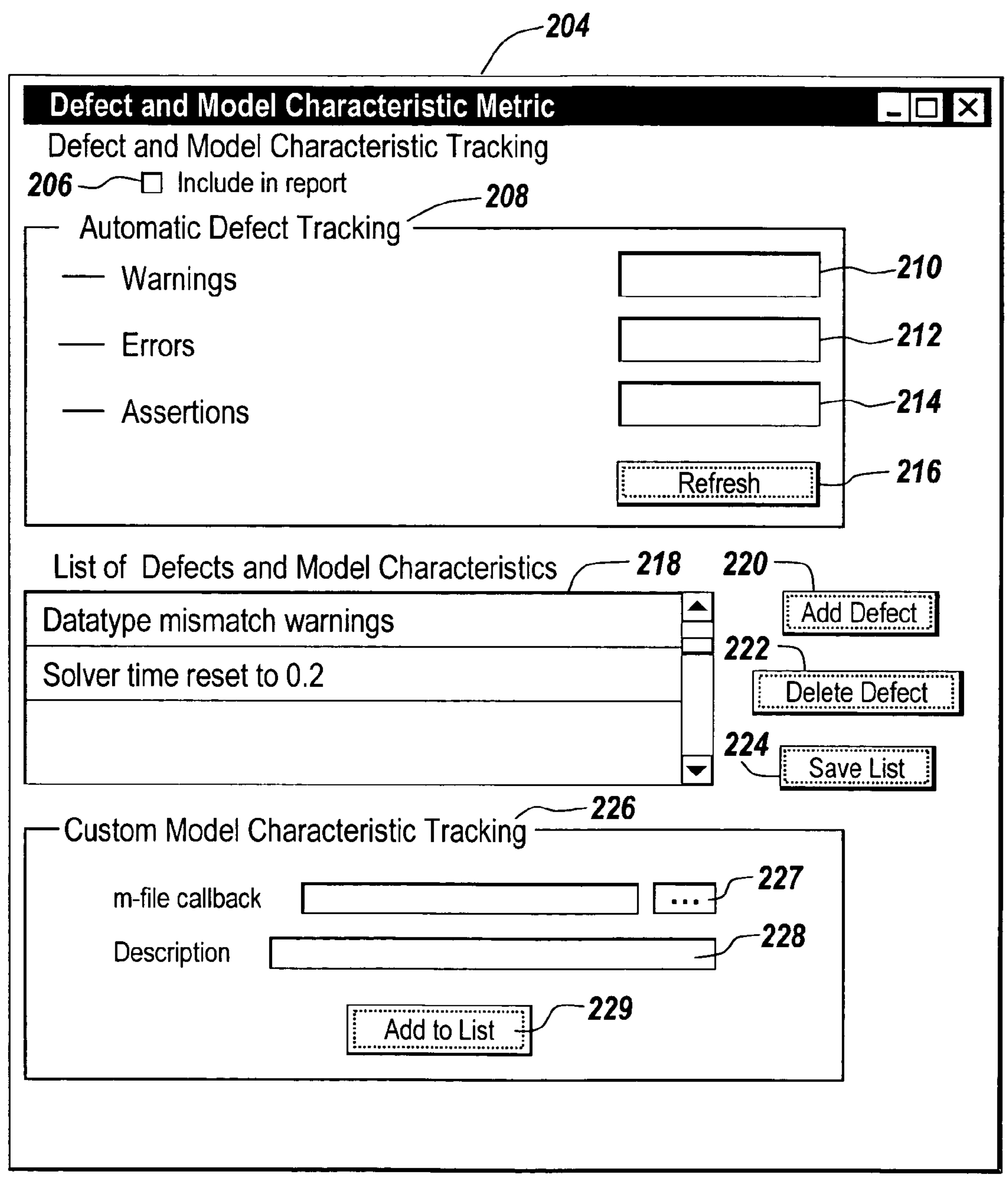
FIG. 8 is an exemplary graphical user interface for interacting with metric tool 126 to acquire a defect metric of a model.

FIG. 8 depicts an exemplary graphical user interface for using metric tool 126 to measure defect metric of a model. Defect and model characteristic metric window 204 includes automatic defect tracking region 208 that lists the number of warnings in a first text field 210, the number of errors in a second text field 212, and the number of assertions in a third text field 214. Automatic defect tracking region 208 may include a refresh button 216 so that when a user clicks on refresh button 216, text fields 210, 212, and 214 will be updated. Defect and model characteristic metric window 204 may also include table 218 for displaying a list of captured defects, both automatically and manually. Manually, a user may add a defect by clicking on add defect button 220 and delete a defect by clicking on delete defect button 222. Lastly, a user may choose to save the lists of defects in table 218 by clicking on save list button 224. Defect is broadly defined in the present invention as any artifact in a model that would render the model inoperable or would lead to unpredictable behavior. In general, defects can be separated into two categories: machine detectable defects and algorithmic flaws. Machine detectable defects can be detected automatically and are detected upon compilation of a model, such as errors, warnings and assertions. By way of an example, Simulink® from MathWorks, Inc. Natick Mass. fires a callback each time an error, a warning, or an assertion is detected. Metric tool 126 may hook each callback fired and add the identified defect to the list of defects in table 218 and increment the corresponding counter in one of the first, second, and third text fields 210, 212, and 214. The metric tool may also obtain the number of defects of algorithmic flaws such as accidental flaws, or improvements of the model design. Algorithmic flaws can be tracked by generating in table 218 manual entries of engineering defects recognized by a user.

In addition to defects, model characteristics may also be tracked, which does not require changes to be made to the model. For example, certain model construct may lead to better code generation than others. To illustrate, consider the following example:

Input→Gain→Unit Delay→Output

This example may represent an atomic subsystem in Simulink® with one input and output, where the input is connected to a gain that is further connected to a unit delay that is further connected to the output of the atomic subsystem. Such an atomic subsystem may lead to algebraic relations between the input and output of the subsystem. However, if the order of the gain and unit delay block is changed so that the relationship between the input and the output is as follows, Input→Unit Delay→Gain→Output the functionality of the subsystem has not changed and the model may still be executed, but there can never be an algebraic relation between the input and output.

Defect and model characteristic metric window 204 further includes a custom model characteristic tracking option 226 that allows a user to track model characteristics using a MATLAB® script. Custom model characteristic tracking option 226 may include a text field 225 allowing a user to enter the location and name of the MATLAB® script. Alternatively, a user may use the browse button 227 to select a MATLAB® script from storage. Custom model characteristic tracking option 226 also includes text field 228 for the user to input a description of the custom model characteristic. A user may then add the custom model characteristic item to the table 218 by clicking on the add to list button 229.

Certain modeling styles may also be tracked using the custom model characteristic tracking option 226. For example, a company may have syntactic guidelines for its engineers regarding naming conventions for building blocks of a model so that when pieces of smaller projects are put together to form one big model, the big model would be presentable to a customer. One of ordinary skill in the art will appreciate that the model may still be executed regardless if the naming convention is followed. One of ordinary skill in the art will also appreciate that these examples given here are merely for better understanding of the present invention and nowhere should it be used to limit the scope of the present invention.

Figure 9:
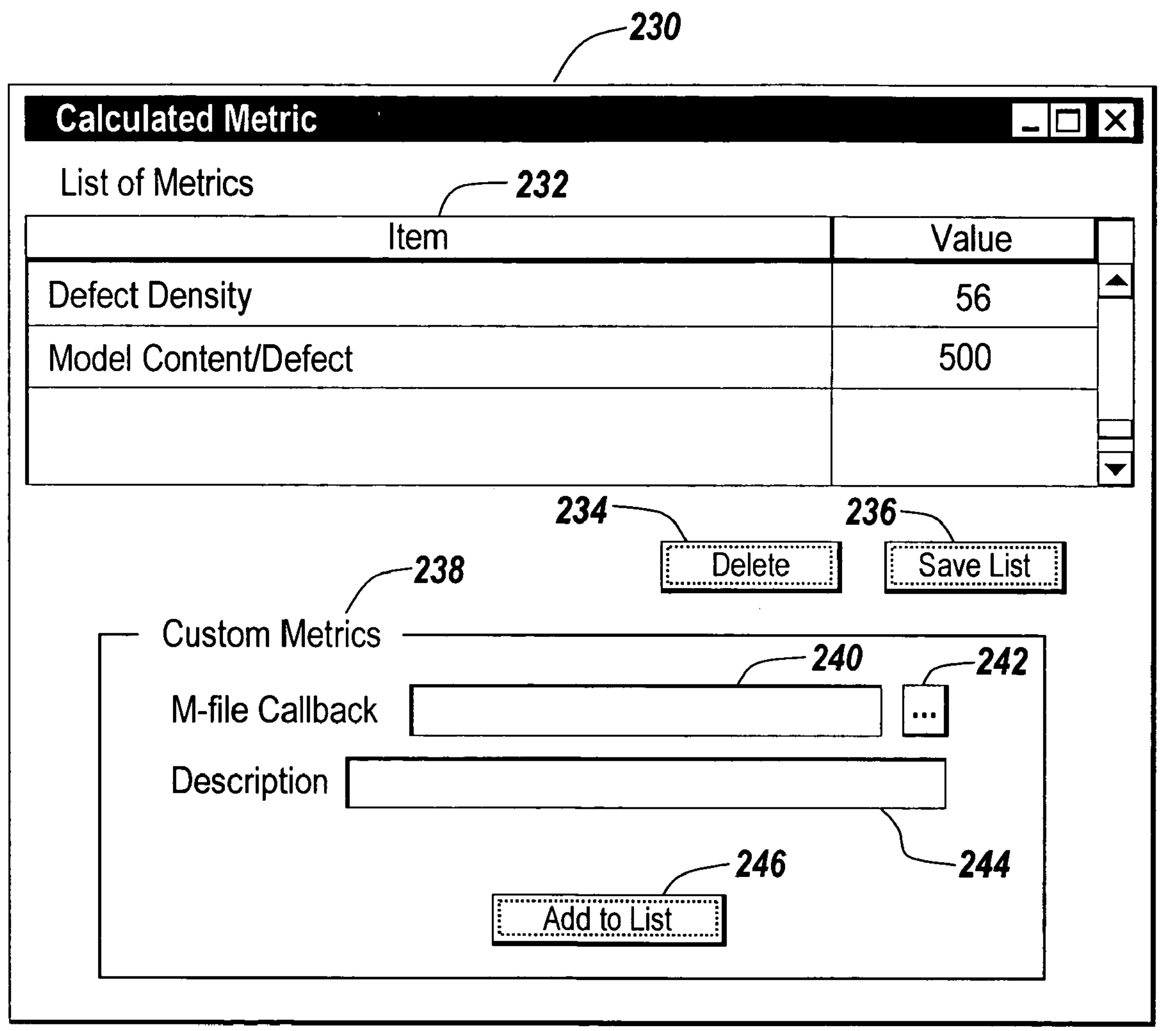
FIG. 9 is an exemplary graphical user interface for interacting with metric tool 126 to generate automatic and manually calculated metrics.

FIG. 9 depicts an exemplary graphical user interface for using the metric tool 126 to display a list of calculated metrics. By way of example, FIG. 9 is described related to a model in a MATLAB® based application. Calculated metric window 230 includes a table 232 showing a list of metrics and a custom metrics option 238. Table 232 includes a first column listing descriptions of metric items and a second column displaying the value of the corresponding metric item in the same row. Delete button 234 enables a user to delete a metric item from table 232. Save list button 236 allows a user to save the list of metric items in table 232. Custom metrics option 238 enables a user to use user-defined calculations to evaluate specific qualities of building and/or configuring a model. Text field 240 allows a user to type in the name of an m-file where a user defines and stores a user-defined calculation. Browse button 242 allows a user to browse storage 116 for an m-file the user wants to use to calculate a user-defined metric. Text field 244 lets a user to input a description of custom metric the m-file in text field 240 represents. Add to list button 246 allows a user to add to table 232 a custom metric item described by the description input in text field 244.

Reports can be generated to display the different metrics illustrated in FIG. 4 through 9. Reports may be in the format of, but not limited to, a text file, a Microsoft Word document, rich text document, Postscript document, a pdf document, a web page, and a spreadsheet. Plots may also be generated to give a user a visual report. Plots may be in the format of any one of a bar graph, a pie chart, and the like. Plots may also be embedded within a text-based report to give a user detail report of effort both textually and visually. Reports and plots may be saved in storage 116 and used later as a baseline for predicting resources (such as time and effort) required for a future task.

One of ordinary skill in the art will appreciate that although the present invention has been describe prevailingly in the graphical domain, such as a graphical modeling environment, the present invention may also be applied in a textual domain. Definitions of cyclomatic complexity, defects, operations, model entities, and the like may be adjusted to apply to a specific textual domain. As such, the present invention may be applied to textual models as well as isolated algorithms.

Many alterations and modifications may be made by those having ordinary skill in the art without departing from the spirit and scope of the invention. Therefore, it must be expressly understood that the illustrated embodiments have been shown only for the purposes of example and should not be taken as limiting the invention, which is defined by the following claims. These claims are to be read as including what they set forth literally and also those equivalent elements which are insubstantially different, even though not identical in other respects to what is shown and described in the above illustrations.

I claim:

1. A method for automatically measuring effort in working on a model, the method comprising:

providing a graphical modeling application using a computing device;

identifying an activity for which a user wishes to measure effort, the activity comprising designing or modifying at least one of a block, a subsystem, and said model using said modeling application;

measuring, using the computing device, a time period for the user to complete the activity;

automatically gathering, using the computing device, data related to usage of an input device related to the activity;

storing the data related to the usage of the input device in a storage device; and determining, using the computing device, the effort in working on the model based on the time period and the data.

2. The method of claim 1, wherein the input device is one of a mouse and a keyboard.

3. In a computing device, a method of automatically measuring productivity in a graphical modeling environment, the method comprising:

identifying a task for which a user wishes to measure the productivity, the task comprising designing or modifying at least one of a block, a subsystem, and a model using the modeling environment;

providing, using the computing device, a plurality of entities from the modeling environment for use with the task, wherein each entity has a type;

measuring, using the computing device, time spent for the user to complete the task;

automatically tracking and storing usage of different types of entities, using the computing device, while the user is working on the task; and determining, using the computing device, the productivity in the graphical modeling environment based on the usage of the different types of entities and the time.

4. The method of claim 3, further comprising:

assigning, using the computing device, a weight for each type of said plurality of entities;

calculating, using the computing device, a weighted metric from said plurality of entities.

5. The method of claim 4, wherein the weight for a type of said plurality of entities is related to complexity of building and configuring said type of said plurality of entities.

6. The method of claim 3, further comprising:

setting, using the computing device, a predicted time period required to complete said task.

7. The method of claim 3, further comprising:

detecting, using the computing device, at least one of a defect and model characteristic in said task.

8. In a computing device, a computer-readable medium holding computer executable instructions, the instructions when executed causing a computer to perform:

providing a graphical modeling application;

identifying a task for which a user wishes to automatically measure productivity, the task comprising designing or modifying at least one of a block, a subsystem, and a model using the modeling application;

assigning a weight for each type of a plurality of entities provided from the modeling application for use with the task and calculating a weighted content metric from the plurality of entities; and evaluating effort put into the task from the weighted content metric and by automatically tracking use of the input device.

9. The medium of claim 8, wherein said medium further comprises instructions that when executed cause a computer to perform:

providing a plurality of entities for use with said task; and assigning a weight for each type of said plurality of entities.

10. The medium of claim 8, wherein said medium further comprises instructions that when executed cause a computer to perform:

measuring time spent for the user to complete said task.

11. The medium of claim 8, wherein said medium further comprises instructions that when executed cause a computer to perform:

detecting at least one of a defect and a model characteristic in said task.

12. In a graphical modeling environment, a system for measuring productivity of a task, the system comprising:

an input device; and a processor configured to process:

a task to be completed in said modeling environment, the task involving designing or modifying one of a block, a subsystem, and a model, and a metric tool comprising:

an input device tracker for automatically tracking use of the input device, a productivity evaluator for determining the productivity of the task based on the use of the input device, and a detector for detecting a defect or a model characteristic in the task.

13. The system of claim 12, wherein the metric tool further comprises a weighted content calculator that is capable of normalizing contents created during said task with an assigned weight for each type of contents.

14. The system of claim 13, wherein the metric tool further comprises a timer for measuring time spent to complete said task.

15. The system of claim 14, wherein the metric tool further comprises:

a report generator for reporting metrics found by at least one of said timer, said input device tracker, and said weighted content calculator.

16. The system of claim 12, wherein the metric tool further comprises:

a defect detection mechanism for detecting defects in said task.

17. The system of claim 12, wherein the metric tool further comprises:

a model characteristic detection mechanism for detecting model complexity in said model.

18. The system of claim 12, wherein the metric tool is on a server and the input device is on a client and the modeling environment is remotely accessed by a user on the client.

19. In a graphical modeling environment, a system for measuring productivity of a task, the system comprising:

a processor configured to process:

a plurality of entities for use in the modeling environment;

a task to be completed in the modeling environment, the task comprising designing or modifying at least one of a block, a subsystem, and a model;

a time predictor for setting a predicted time period required to complete the task; and a metric tool comprising an entity calculator automatically tracking usage of the plurality of entities in the task and a productivity evaluator determining the productivity of the task based on the usage of the plurality of entities.

20. A productivity management method comprising:

tracking, using a computing device, productivity data of a user within a managed group by measuring effort and time spent for each task, the each task comprising designing or modifying at least one of a block, a subsystem, and a model in a graphical modeling environment, and the effort being measured by a weighted content metric and usage of an input device;

assigning, using the computing device, a weight for each type of a plurality of entities provided from the modeling environment for use with the each task and calculating the weighted content metric from the plurality of entities;

storing the productivity data in a storage device; and predicting time and effort required to complete a future task, using the computing device, based on the productivity data.

21. The method of claim 20, further comprising:

determining, using the computing device, a bonus for said user using said productivity data.

22. The method of claim 20, wherein the effort is further measured by number of defects detected in each task.

23. The method of claim 22, further comprising:

evaluating, using the computing device, quality of each task with said number of defects detected; and evaluating, using the computing device, at least one of productivity and effort of each task with the measured effort and time spent.

24. The method of claim 20, wherein the effort is further measured by model characteristics detected in each task.

25. The method of claim 24, wherein the model characteristics are related to model complexity.

26. The method of claim 20, further comprising:

generating, using the computing device, a report of said productivity data.

27. A method of improving an application program comprising:

monitoring, using a computing device, user activity with an application program by automatically tracking usage of an input device;

recording, using the computing device, time spent on a plurality of tasks, wherein the plurality of tasks comprises at least one of an application program task performed by the application program and a user task performed by the user, the user task comprising designing or modifying at least one of a block, a subsystem, and a model;

determining, using the computing device, effort in working on the plurality of tasks based on the time spent; and generating, using the computing device, a report including the time spent on the plurality of tasks and the usage of the input device.

28. The method of claim 27, wherein one of the plurality of tasks comprises waiting for the application program to compile a model.

29. The method of claim 28, further comprising:

modifying, using the computing device, the application program to speed up compilation of a model.

30. The method of claim 27, wherein the report indicates multiple appearance of a specific sequence of input activity.

31. The method of claim 27, further comprising:

modifying, using the computing device, the application program to eliminate the appearance of the specific sequence of input activity.

32. The method of claim 27, wherein the report indicates a performance issue.

33. The method of claim 32, further comprising:

modifying, using the computing device, the application program to eliminate the performance issue.

34. The method of claim 31, further comprising:

improving, using the computing device, the application program in response to the report.

* * * * *